United States Patent
HuangFu et al.

(10) Patent No.: US 10,938,918 B2
(45) Date of Patent: Mar. 2, 2021

(54) INTERACTIVELY UPDATING MULTIMEDIA DATA

(71) Applicant: International Business Machines Corporation, Armonk, NY (US)

(72) Inventors: Peng HuangFu, Xi'an (CN); Li Ting, Xi'an (CN); Jian Wang, Beijing (CN); Ying Wei, Xi'an (CN); Fei Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 14/717,438

(22) Filed: May 20, 2015

(65) Prior Publication Data

US 2015/0381684 A1    Dec. 31, 2015

(30) Foreign Application Priority Data

Jun. 26, 2014    (CN) .......................... 201410295570.8

(51) Int. Cl.
*H04L 29/08*    (2006.01)
*H04L 29/06*    (2006.01)

(52) U.S. Cl.
CPC .......... *H04L 67/16* (2013.01); *H04L 65/1089* (2013.01); *H04L 65/1096* (2013.01); *H04L 65/403* (2013.01); *H04L 67/2804* (2013.01)

(58) Field of Classification Search
CPC ......... H04L 65/60; H04L 67/10; H04L 67/16; H04L 65/1089; H04L 65/1096; H04L 65/403; H04L 67/2804
See application file for complete search history.

(56) References Cited

U.S. PATENT DOCUMENTS

| 5,717,468 A * | 2/1998 | Baryla ................. G11B 27/034 345/636 |
| 7,590,230 B1 | 9/2009 | Surazski |

(Continued)

FOREIGN PATENT DOCUMENTS

| CA | 103794098 | 5/2014 |
| CN | 102084319 | 6/2011 |

(Continued)

OTHER PUBLICATIONS

Brian Burgess, "How to Add Comments to Documents in Word 2010", Aug. 26, 2010. Retrieved from web page https://www.howtogeek.com/howto/26867/how-to-add-comments-to-documents-in-word-2010/. (Year: 2010).*

(Continued)

*Primary Examiner* — Dhairya A Patel
*Assistant Examiner* — Sandarva Khanal
(74) *Attorney, Agent, or Firm* — Schmeiser, Olsen & Watts, LLP; Nicholas L. Cadmus

(57) ABSTRACT

A method and associated system for updating recorded multimedia data. An interactive request pertaining to a portion of recorded multimedia data is received. A response to the received request is received. A determination is made of a location, within the recorded multimedia data where the portion (of the recorded multimedia data to which the request pertains) is located. The interactive request and a feedback are combined into a combination. The combination of the interactive request and the feedback, or a link pointing to the combination stored external to the recorded multimedia data, is added to the recorded multimedia data at the location of the portion.

11 Claims, 6 Drawing Sheets

(56) References Cited

U.S. PATENT DOCUMENTS

| | | | | |
|---|---|---|---|---|
| 2002/0129057 | A1* | 9/2002 | Spielberg | G06F 3/165 715/201 |
| 2005/0097451 | A1* | 5/2005 | Cormack | H04N 21/858 715/202 |
| 2005/0232423 | A1* | 10/2005 | Horvitz | G06Q 10/10 380/255 |
| 2006/0129933 | A1* | 6/2006 | Land | G11B 27/034 715/723 |
| 2007/0204310 | A1* | 8/2007 | Hua | H04N 7/17318 725/88 |
| 2007/0206581 | A1* | 9/2007 | Nam | H04L 65/605 370/356 |
| 2008/0137558 | A1* | 6/2008 | Baird | H04L 12/1831 370/260 |
| 2008/0177752 | A1* | 7/2008 | Kulkarni | G06F 16/48 |
| 2008/0306925 | A1* | 12/2008 | Campbell | G06F 17/30038 |
| 2009/0006193 | A1* | 1/2009 | Forbes | G06Q 20/102 705/14.54 |
| 2009/0049186 | A1* | 2/2009 | Agnihotri | H04N 7/17336 709/231 |
| 2009/0300520 | A1* | 12/2009 | Ashutosh | H04L 12/1831 715/756 |
| 2009/0327896 | A1* | 12/2009 | Pall | H04L 67/025 715/730 |
| 2011/0078728 | A1* | 3/2011 | Fu | H04N 21/812 725/35 |
| 2011/0228921 | A1* | 9/2011 | Singh | H04L 12/1831 379/202.01 |
| 2011/0267419 | A1 | 11/2011 | Quinn et al. | |
| 2012/0128322 | A1 | 5/2012 | Shaffer et al. | |
| 2012/0173992 | A1* | 7/2012 | D'Angelo | H04L 65/40 715/751 |
| 2012/0226753 | A1* | 9/2012 | Cheng | H04M 1/72547 709/204 |
| 2012/0253492 | A1* | 10/2012 | Andrews | H04W 4/029 700/94 |
| 2013/0054467 | A1* | 2/2013 | Dala et al. | G06F 19/3418 705/51 |
| 2013/0088946 | A1* | 4/2013 | Bak | G11B 20/1816 369/53.15 |
| 2013/0145269 | A1* | 6/2013 | Latulipe | G06F 3/04847 715/720 |
| 2013/0250035 | A1* | 9/2013 | Murali | H04M 3/56 348/14.09 |
| 2013/0322843 | A1* | 12/2013 | Suzuki | H04N 5/76 386/230 |
| 2013/0339443 | A1* | 12/2013 | Goldman | H04L 65/403 709/204 |
| 2014/0324542 | A1* | 10/2014 | Marshall | G06Q 30/0201 705/7.32 |
| 2014/0372908 | A1* | 12/2014 | Kashi | H04L 65/4038 715/753 |
| 2015/0055936 | A1* | 2/2015 | Emery | H04N 5/265 386/278 |

FOREIGN PATENT DOCUMENTS

| | | |
|---|---|---|
| CN | 103380627 | 10/2013 |
| CN | 103548339 | 1/2014 |

OTHER PUBLICATIONS

Automated Meeting Replay, IP.com No. 000234720, IP.com Electronic Publication: Jan. 31, 2014, 4 pages.

Intelligent Schedule Additional Meeting for Recording and Live Question and Answer (Q/A), IP.com No. 000218105, IP.com Electronic Publication: May 21, 2012, 4 pages.

Hui Xue et al., Posing Questions About a Recorded Meeting, IP.com No. 000226876, IP.com Electronic Publication: Apr. 23, 2013, 9 pages.

Contextual Asking and Answering of Questions During a Recorded Training Audio or Video, IP.com No. 000236361, IP.com Electronic Publication: Apr. 22, 2014, 6 pages.

CN Office Action, 201410295570.8, dated Feb. 27, 2018, 4 pages.

CN OA search report, 201410295570.8, dated Feb. 27, 2018, 2 pages.

* cited by examiner

INTERACTIVELY UPDATING MULTIMEDIA DATA

TECHNICAL FIELD

The present invention relates to a multimedia data recording technology, and more specifically, to a method and system for interactively updating multimedia data.

BACKGROUND

At present, multimedia data records have gained an increasingly popular application in distributed working environments. Employees of many companies are distributed in various locations, such that teleconference is always employed for meeting, discussion, and training. However, due to reasons such as jet lag and other job tasks, employees always cannot attend the meeting on time; therefore, it is required to re-listen meeting recordings or view meeting videos after the end of the meeting, i.e., playing back the already recorded multimedia data. During the playback process, even a listener/viewer has questions to pose or discuss with the speaker, the listener/viewer cannot pose questions and get feedback at any time in a same manner as the participants attending the meeting in time. The listener/viewer can only pose questions to the speaker through post emails or phone calls and the listener/viewer always gives up the question and discussion opportunities due to being unable to contact the speaker promptly. Besides, the discussion between a certain listener/viewer is conducted point-to-point, and other listeners/viewers cannot get the discussion information. Since the audio or video records of the meeting cannot cover all post questions-and-answers and discussion information, it is impossible to guarantee the integrity of the audio or video records of the meeting, and listeners failing to attend the meeting in time cannot receive the most comprehensive information and cannot participate in relevant questions-and-answers and discussion procedures.

BRIEF SUMMARY

The present invention provides a method and associated system for updating recorded multimedia data. An interactive request pertaining to a portion of recorded multimedia data is received. A response to the received request is received. A determination is made of a location, within the recorded multimedia data where the portion (of the recorded multimedia data to which the request pertains) is located. The interactive request and the feedback are combined into a combination. The combination of the interactive request and the feedback, or a link pointing to the combination stored external to the recorded multimedia data, is added to the recorded multimedia data at the location of the portion.

DETAILED DESCRIPTION

The present invention provides a method and system enabling a listener or viewer of recorded multimedia data to interactively update the recorded multimedia data. The present invention maintains the integrity of interactively updated multimedia data and the transparency of the updated multimedia data to a user. In other words, the user needs not obtain subsequent interactively updated information from other information source.

The present invention provides a method for interactively updating multimedia data, comprising: receiving an interactive request for recorded multimedia data; receiving feedback provided for the received interactive request; determining a location of the interactive request and the feedback in the recorded multimedia data, and combining the interactive request and the feedback to the recorded multimedia data according to the determined locations.

The present invention provides a system for interactively updating multimedia data, comprising: a first receiving module configured to receive an interactive request for recorded multimedia data; a second receiving module configured to receive feedback provided for the received interactive request; a location determining module configured to determine a location of the interactive request and the feedback in the recorded multimedia data, and a combining module configured to combine the interactive request and the feedback to the recorded multimedia data according to the determined locations.

Some embodiments of the present invention will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
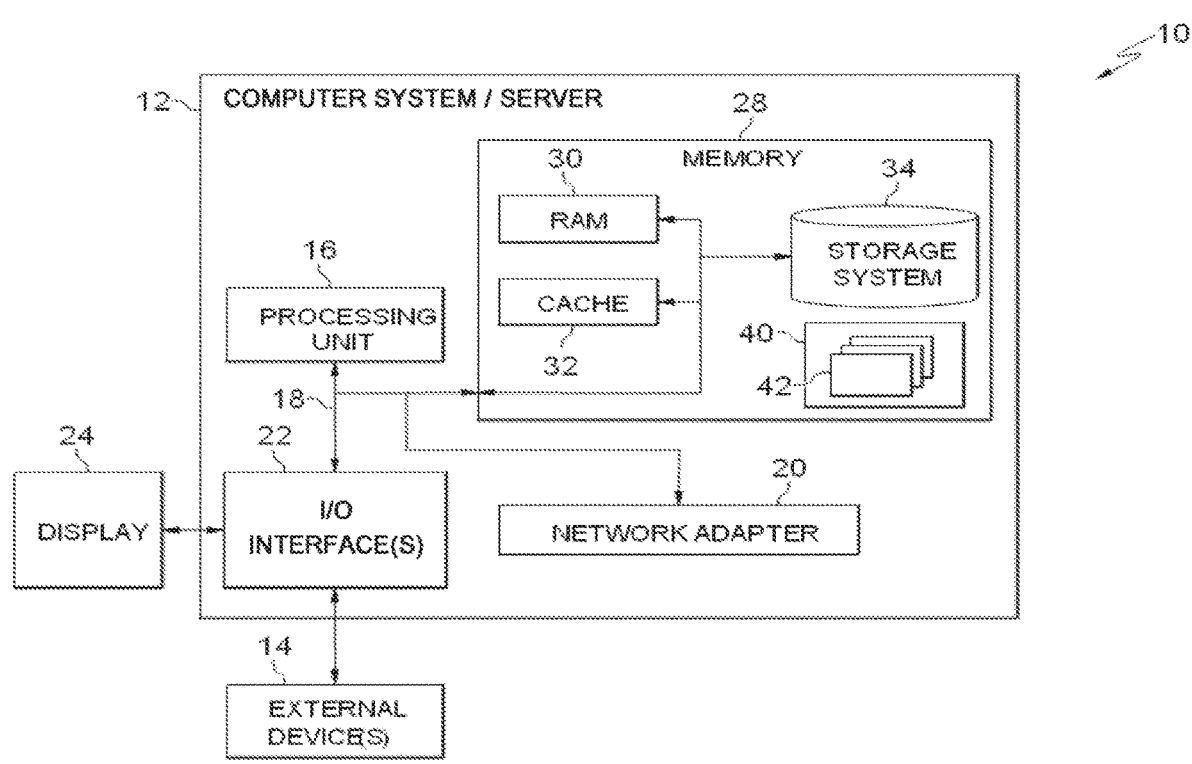
FIG. 1 shows an exemplary computer system/server, in accordance with embodiments of the present invention.

FIG. 1 illustrates a schematic diagram 10 of an exemplary computer system/server 12, in accordance with embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

"Multimedia data" refers to any data disclosed through audio, video, image and the like, which may only include audio data, e.g., recording files such as MP3, or may only include video data, e.g., video files such as MP4, WMV, etc., or may include data combining audio and video data.

Figure 2:
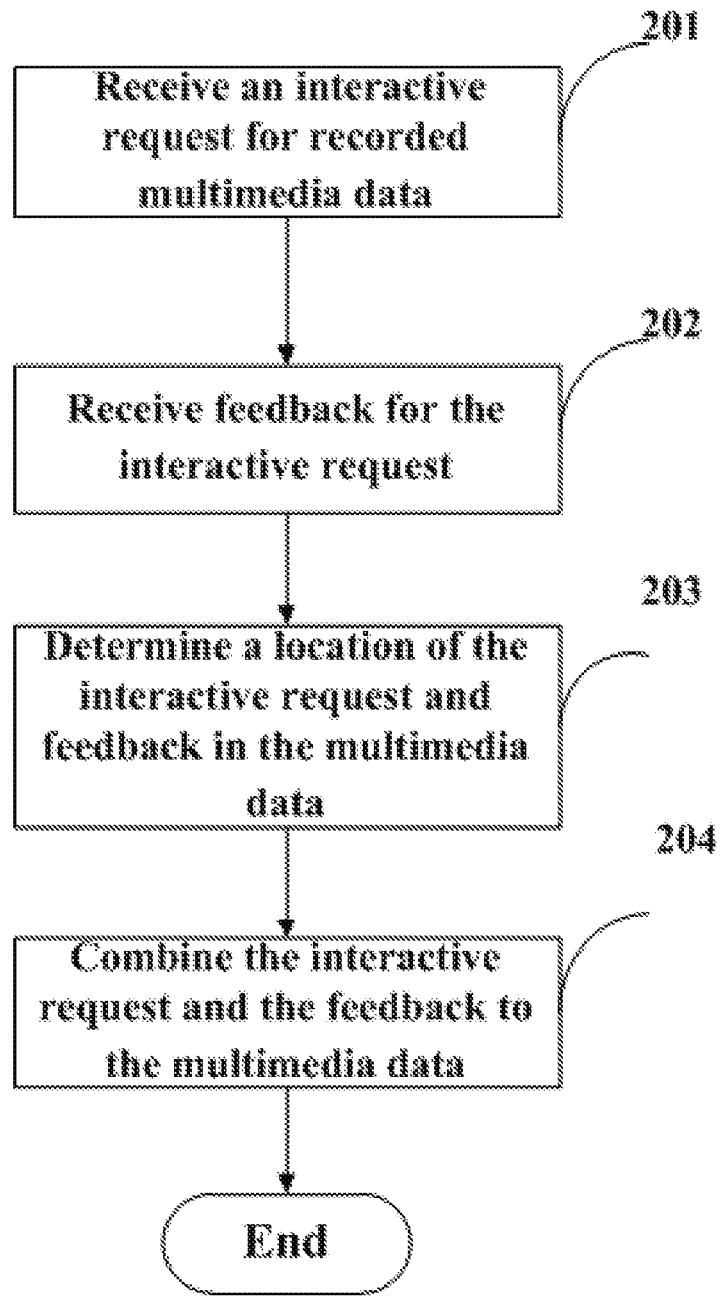
FIG. 2 shows a flow chart of a method for interactively updating multimedia data, in accordance with embodiments of the present invention.

FIG. 2 shows a flow chart of a method of interactively updating multimedia data, in accordance with embodiments of the present invention.

The method shown in FIG. 2 starts from step 201. In step 201, an interactive request for recorded multimedia data is received. According to one embodiment of the present invention, the interactive request may be a question filed by a listener or viewer during the process of listening to or viewing the recorded multimedia data, or a topic to be discussed. The interactive request may be filed in a manner of voice, or filed in a manner of text through text input, or filed through any other manner, such as picture, video, etc. In one embodiment, the request pertains to a portion of recorded multimedia data.

Next, the method shown in FIG. 2 proceeds to step 202. In step 202, a response to the received interactive request is received. In one embodiment, the response comprises feedback to the request. In one embodiment, the response comprises a refusal to provide feedback to the request.

According to one embodiment of the present invention, a feedback party refers to a speaker of the received multimedia data, because a questioner generally poses a question to the speaker. When the questioner issues an interactive request when listening to or viewing multimedia data playback, because the speaker of the multimedia data or the owner of the information has been recorded in advance, the interactive request may be automatically forwarded to a default feedback party responsible for answering questions, which does not require the questioner to specifically designate a feedback party. The interactive request may be forwarded through existing communication manners, e.g., sending a mail regarding the interactive request to the default feedback party via email. When the questioner records the interactive request through voice recording, the questioner may call the default feedback party via phone to play the recorded interactive request content. Those skilled in the art understand that after the interactive request is received, the interactive request may be forwarded to the feedback party through any manner of communication in the prior art. According to another embodiment of the present invention, the feedback party is designated by the party filing the interactive request, because in some cases, the party filing the interactive request knows best who is most suitable for answering the question the party filing the interactive request poses or for making relevant discussions. According to a still further embodiment of the present invention, the feedback party is further designated by the default feedback party. In other words, when the default feedback party (e.g., speaker) believes that some problems are suitable for other subjects to answer or participate in the discussion, a feedback party may be further designated, and the interactive request is forwarded to the new feedback party. Those skilled in the art should understand that the present invention does not limit a specific manner of determining the feedback party, or limit the communication manner of transmitting the interactive request to the feedback party. The feedback may be provided by the feedback party via voice, text and picture, or video recording, or a combination thereof.

According to one embodiment of the present invention, the receiving feedback provided for the received interactive request further comprises: informing the party which sends out the interactive request in response to the requested party refusing to provide feedback. Those skilled in the art should understand that in some cases, the feedback party may refuse to answer some questions. When the interactive request is refused by the feedback party, it may be informed to the party filing the interactive request.

Next, the method shown in FIG. 2 proceeds to step 203 which determines a location of the interactive request and the feedback in the recorded multimedia data. In one embodiment, step 203 determines a location, within the recorded multimedia data, where the portion is located. As discussed supra, the "portion refers to the portion of the recorded multimedia data to which the interactive request pertains. The location: may precede the beginning of the portion, may be after the entire portion, or may be at an intermediate location within the portion.

In one embodiment, the "location" refers to the corresponding multimedia data on the time axis. Since the recorded multimedia data needs to be updated using the interactive request and corresponding feedback, it is determined at which location of the multimedia data the interactive request and the feedback are updated. For example, a conference recording file has a total time length of 30 minutes, during which there might be interleaved with a plurality of interactive requests and corresponding feedback. Therefore, it is important for guaranteeing the consistency of the contents of the recording file to reasonably determine the locations of the interactive requests and feedback in the recording file. According to one embodiment of the present invention, in response to a particular location in the recorded multimedia data being designated as a point of interest, the particular location is determined as the location for the interactive request and the feedback in the recorded multimedia data. For example, for the 30-minute meeting recording file, a person listening to the playback needs to pose a question on the content in talk at 00:20:15, the person may mark the time point for the question by clicking onto a particular button or through other manners in the audio file player. Such marking action designates the particular location at 00:20:15 of the recording file as the point of interest, and the interactive request as filed and the subsequently provided feedback should be combined to 00:20:15 of the original recording file. Thus in one embodiment, determining the location, within the recorded multimedia data, where the portion (i.e., the portion of the recorded multimedia data to which the interactive request pertains) is located comprises: determining a time, at which the portion begins to be played back, relative to a time at which a beginning of the recorded multimedia data begins to be played back.

According to another embodiment of the present invention, designating the point of interest may be made by the interaction requester after listening or viewing the multimedia data, instead of in real time during the process of playback. According to a further embodiment of the present invention, the point of interest may be jointly designated by the feedback party and the party filing the interactive request; or, even the feedback party may designate in priority the point of interest, i.e., the location where the interactive request and corresponding feedback should be in the original multimedia. The priority rights and policies for designating a point of interest may be prescribed dependent on different application scenarios, and the present invention has no limitation in this regard. According to the embodiments of the present invention, the specific manner of designating a point of interest may include, for example, in response to a button for pause being clicked onto or a button for question being clicked onto, determining the location of the pause or the location where the play reaches when the button for question is clicked onto as the point of interest. Of course, there may also be a plurality of manners to mark and trigger designation of a point of interest.

According to another embodiment of the present invention, determining a location of the interactive request and the feedback in the recorded multimedia file comprises: analyzing content of the interactive request and the feedback; locating, in the recorded multimedia data, content most relevant to the content of the interactive request and the feedback; determining the location for the located most related content as the location of the interactive request and the feedback in the recorded multimedia data. For example, if the party filing the interactive request does not designate any point of interest, but directly records a segment of question recording as an interactive request for filing, or directly enters a segment of textual question content, the content involved in the interactive request and its corresponding feedback may be analyzed using the existing voice recognition technology and text recognition technology in the prior art, e.g., which keywords are mentioned, which topical contents are mainly involved, etc. Then, they are matched with contents in the recorded multimedia data to determine an appropriate location. For example, the time point at which the same keyword in the interactive request and the feedback appears in the recorded multimedia data is searched as the determined location. Those skilled in the art should understand that techniques such as voice recognition, text recognition, keyword extraction, and content match may be performed using the prior art, which will not be detailed here.

Thus in one embodiment, determining the location where the portion (i.e., the portion of the recorded multimedia data to which the interactive request pertains) is located comprises: (i) analyzing first content selected from the group consisting of content of the request, content of the response, and a combination thereof; (ii) determining a location of second content in the recorded multimedia data, wherein the second content is more relevant to the first content than is any other content in the recorded multimedia data; and (iii) determining that the location of the second content is the location where the portion is located.

Next, the method shown in FIG. 2 proceeds to step 204 to combine the interactive request and the feedback to the recorded multimedia data based on the determined location. According to one embodiment of the present invention, based on the determined location, a link directed to the data for the interactive request and the feedback is added in the recorded multimedia data. For example, in a 30-minute-long conference recording, the requesting party A poses a question by audio at 00:20:15 to ask the speaker to answer; the speaker B subsequently receives the audio interactive request and answers the question likewise by audio; then the two segments of audio (interactive request and corresponding feedback) may be combined to the meeting recording file by adding a link directed to the two segments of audio at 00:20:15 of the conference recording file, while the two segments of audio may be actually stored at any other place. According to one embodiment of the present invention, the link added here is a link that may be automatically recognized by the player. In this way, in response to other users listening to the conference recording file later, the player may automatically identify the link added at a location corresponding to 00:20:15, to automatically and cohesively pause the conference recording file, obtain the audio data from the information source storing the two segments of audio, and play the two segments of audio (interactive request and feedback), and then continue to play the remaining conference recording file. Such user experience is playing a unified conference recording file, and the user will not be aware that some contents are later inserted. According to another embodiment of the present invention, the link added here is a link that needs to be triggered by user click. When the user plays the recording to 00:20:15 of the conference recording file, the conference recording file will be paused to prompt that there is inserted external information, and the link is provided; when the user clicks onto the link, the two segments of audio are obtained and played in sequence. After the play is over, the remaining conference recording file will continue being played.

Combining the interactive request and the feedback to the multimedia data by link may prevent enlarging the multimedia data file due to constant interactive update, which may not convenient for storage and transmission.

According to another embodiment of the present invention, based on the determined location, the interactive request and the feedback are directly added into the recorded multimedia data. According to the above example, two segments of audios regarding interactive request and feedback are directly inserted at 00:20:15. If the total time length of the two segments of audio is 2 minutes, then the total time length of the updated multimedia data will become 32 minutes.

Thus in one embodiment, step 204 comprises (i) generating first data comprising both the request and the response; and (ii) adding, to the portion at the location, either the first data or a link pointing to the first data stored external to the recorded multimedia data. As discussed supra, the "portion refers to the portion of the recorded multimedia data to which the interactive request pertains and the "location" is the location of the portion within the recorded multimedia data.

According to one embodiment of the present invention, a location of combining the interactive request and the feedback to the multimedia data may be flagged in the multimedia data, such that the user may directly play back the content of the interactive request and the feedback by clicking onto the flagged location.

When the interactive request or feedback is communicated in the manner of textual input, a segment of prompt content (e.g., through JavaScript); when the playing arrives at this location, the added prompt content will be automatically exhibited (corresponding to performing a segment of JavaScript code), and the exhibition will last a preset time length.

It is seen that through the method of interactively updating the multimedia data as shown in FIG. 2, any interactive request and corresponding feedback for the recorded multimedia data may be combined to the original multimedia data, such that the user may completely play all interactive requests and corresponding feedback when the multimedia data are played, thereby maintaining integrity of the interactively updated multimedia data and its transparency to the user.

It should be further noted that the interactive request party and the corresponding feedback party may set an access right for a part of interactive content. Since it may be inconvenient to disclose some discussion and question-and-answer content to all users, a corresponding access right may be set while combining the discussion and question-and-answer content to the multimedia data, i.e., only designated people may listen to or view the corresponding interactive request and feedback in accordance with the access right.

Figure 3:
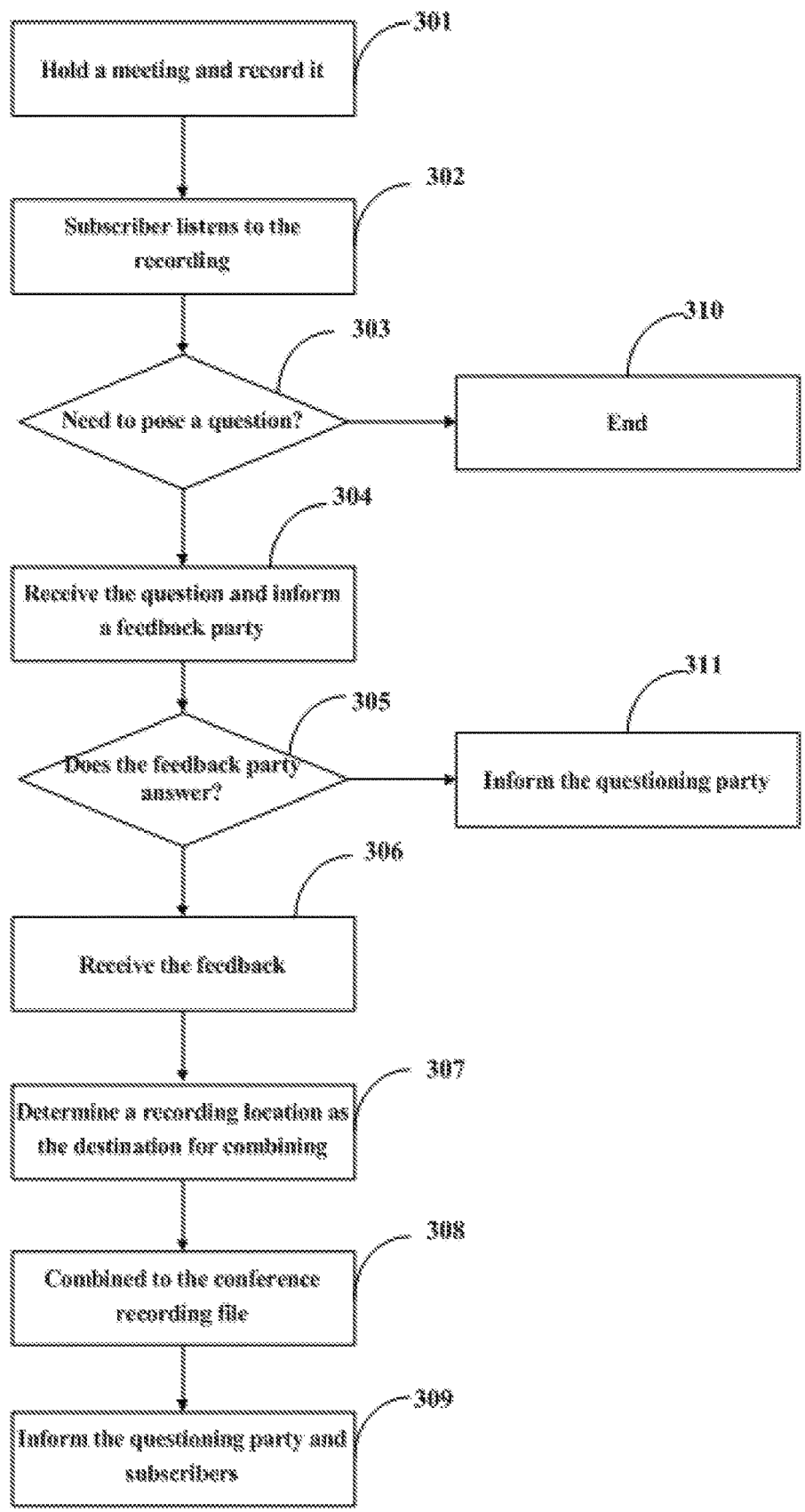
FIG. 3 shows a flow chart of a method for interactively updating multimedia data, such as conference recording, in accordance with embodiments of the present invention.

FIG. 3 shows a flow chart of interactively updating multimedia data, such as conference recording, in accordance with embodiments of the present invention. In step 301, a teleconference is held and recorded. In step 302, a subscriber listens to the conference recording after the end of the conference. In step 303, it is determined whether the subscriber needs to pose questions during the listening process; in the case of needing not to pose questions, the flow proceeds to step 310 to end. In step 303, the manner of determining whether the subscriber needs to pose questions may be performed by providing a function button for pausing the play or posing questions. In response to the button for pausing the play or posing questions being clicked onto, it is determined that the subscriber needs to pose questions. In the case of needing to pose questions, in step 304, a question is received and communicated to the feedback party that there is a subscriber posing a question to answer. Next, in step 305, it is determined whether the feedback party decides to answer the question. In the case of deciding not to answer, in step 311, the questioning party is informed that the question will not be answered (i.e., feedback to the question will not be provided). If the feedback party agrees to answer, in step 306, an answer from the feedback party is received. Next, in step 307, it is determined at which location (i.e., time point) of the conference recording the contents of question and answer are combined, and in step 308, the question and the answer are combined to the conference recording file based on the determined location. Next, in step 309, a subscriber for the questions and other subscribers are informed that the conference recording has an update. These different versions of conference recording may be selectable for subscribers based on their preferences. It should be noted that the flow shown in FIG. 3 is only for exemplarily illustrating the core idea of the present invention, which does not mean any unnecessary limitation to the present invention. For example, the embodiments of the present invention are not only limited to the multimedia data such as conference recording, and step 309 is not compulsory to inform the questioning party and subscribers.

Figure 4:
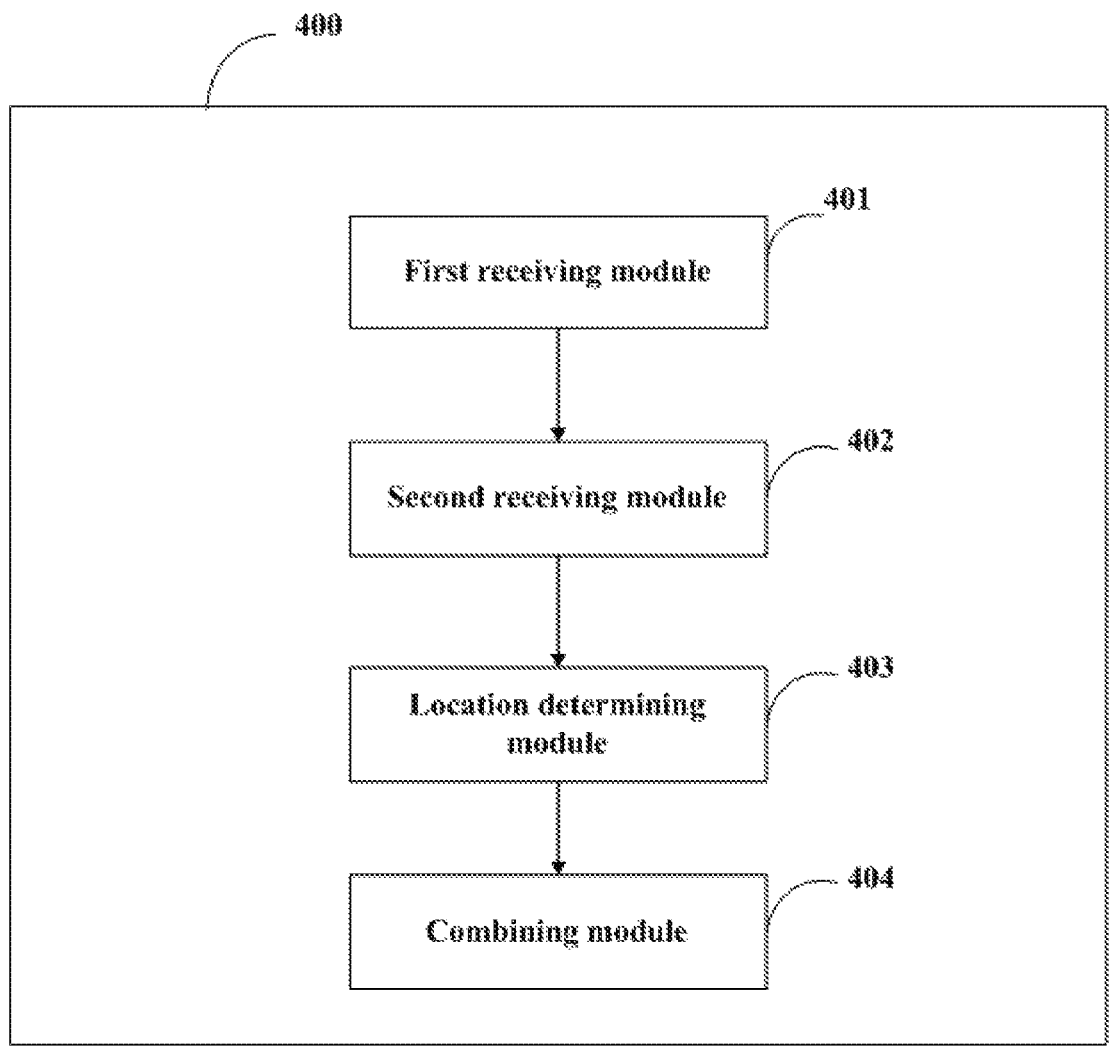
FIG. 4 shows a block diagram of a system for interactively updating multimedia data in accordance with embodiments of the present invention.

FIG. 4 shows a block diagram of a system for interactively updating multimedia data, in accordance with embodiments of the present invention. The system as shown in FIG. 4 is represented by a system 400 in general. Specifically, the system 400 comprises a first receiving module 401 configured to receive an interactive request for the recorded multimedia data; a second receiving module 402 configured to receive a feedback provided for the received interactive request; a location determining module 403 configured to determine a location of the interactive request and the feedback in the recorded multimedia data; and a combining module 404 configured to combine the interactive request and the feedback to the recorded multimedia data according to the determined location. Those skilled in the art should understand that modules or associated modules 401-404 in the system 400 may respectively correspond to steps 201-204 in the method shown in FIG. 2.

According to one embodiment of the present invention, the combining module 404 is configured to adding a link directed to the data of the interactive request and the feedback in the recorded multimedia data according to the determined location. According to another embodiment of the present invention, the combining module is configured to directly add the interactive request and the feedback to the recorded multimedia data according to the determined location.

According to one embodiment of the present invention, the system shown in FIG. 4 may further comprise a forwarding module (not shown in FIG. 4) configured to forward the interactive request to the requesting party.

According to one embodiment of the present invention, the second receiving module 402 is further configured to inform the party which sends out the interactive request in response to the requested party refusing to provide feedback.

According to one embodiment of the present invention, the interactive request for the recorded multimedia data is filed during playback of the recorded multimedia data.

According to one embodiment of the present invention, the location determining module 403 is configured to determine, in response to a particular location of the recorded multimedia data being designated as a point of interest, the particular location as the location of the interactive request and the feedback in the recorded multimedia data.

According to one embodiment of the present invention, the location determining module 403 is configured to analyze content of at least one of the interactive request and the feedback; locating content most relevant to the content of at least one of the interactive request and the feedback in the recorded multimedia data; and determining a location for the located most relevant content as the location of the interactive request and the feedback in the recorded multimedia data.

Figure 5:
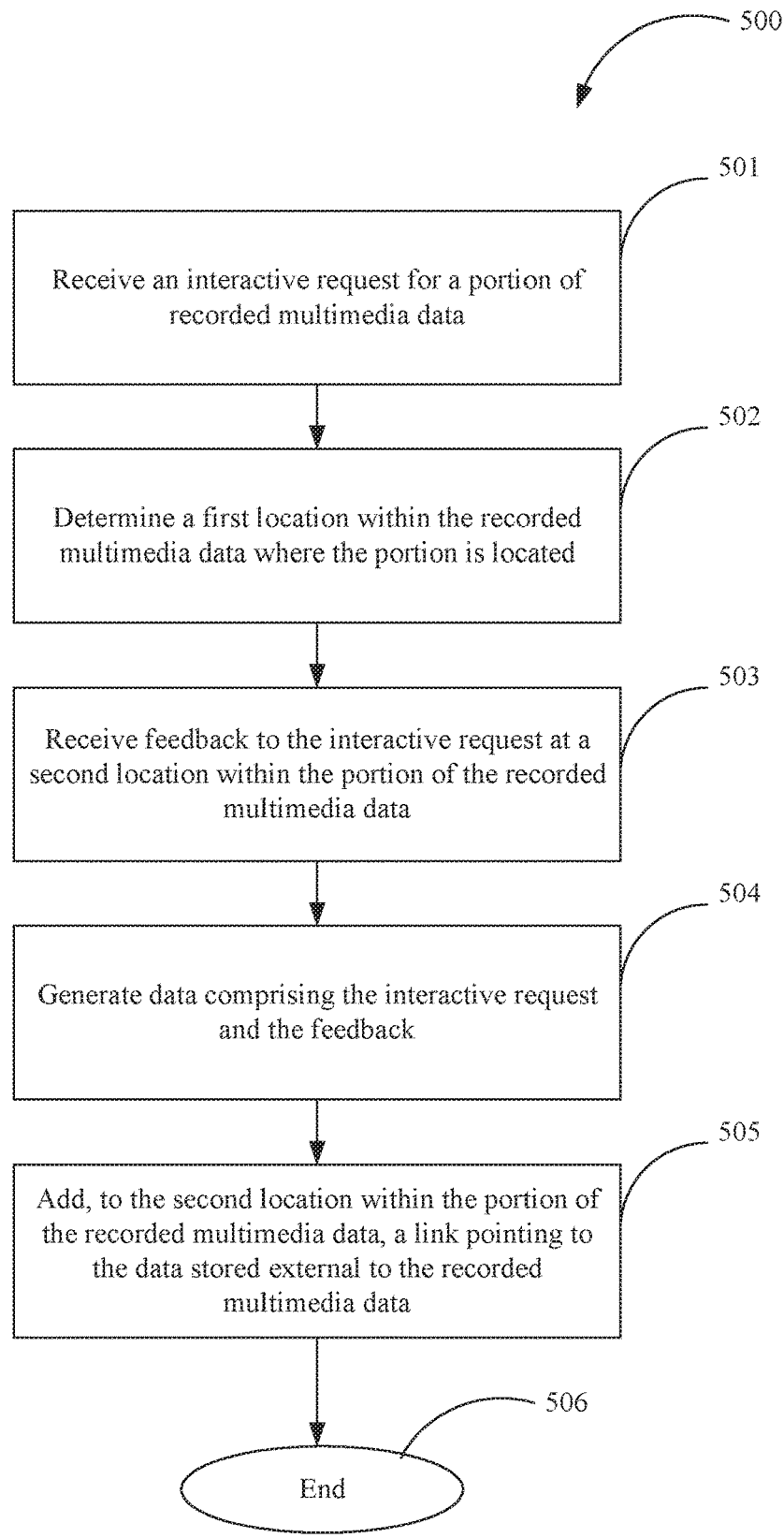
FIG. 5 shows a flow chart of a method for adding a link to a second location within a portion of recorded multimedia data located at a first location, in accordance with embodiments of the present invention.

FIG. 5 shows a flow chart of a method for adding a link to a second location within a portion of recorded multimedia data located at a first location, in accordance with embodiments of the present invention.

A method 500 for updating recorded multimedia data, as shown in FIG. 5, is similar to the method shown in FIG. 2. According to FIG. 5, the method 500 starts at a step 501, where a processor of a computer system may receive an interactive request from a requesting party pertaining to a portion of recorded multimedia data. The step 501 is followed by a step 502, where the processor may determine a first location, within the recorded multimedia data, where the portion of the recorded multimedia data is located.

The step 502 is followed by a step 503, where the processor may receive feedback as a response (e.g., from a feedback party) to the received request at a second location within the portion of the recorded multimedia data. According to some examples, the second location may be designated jointly by the requesting party and the feedback party. The step 503 is followed by a step 504, where the processor may generate data comprising both the request and the response. The step 504 may be followed by a step 505, where the processor may add, to the second location within the portion of the recorded multimedia data, a link pointing to the data stored external to the recorded multimedia data. The step 505 may be followed by a step 506, ending the process.

Figure 6:
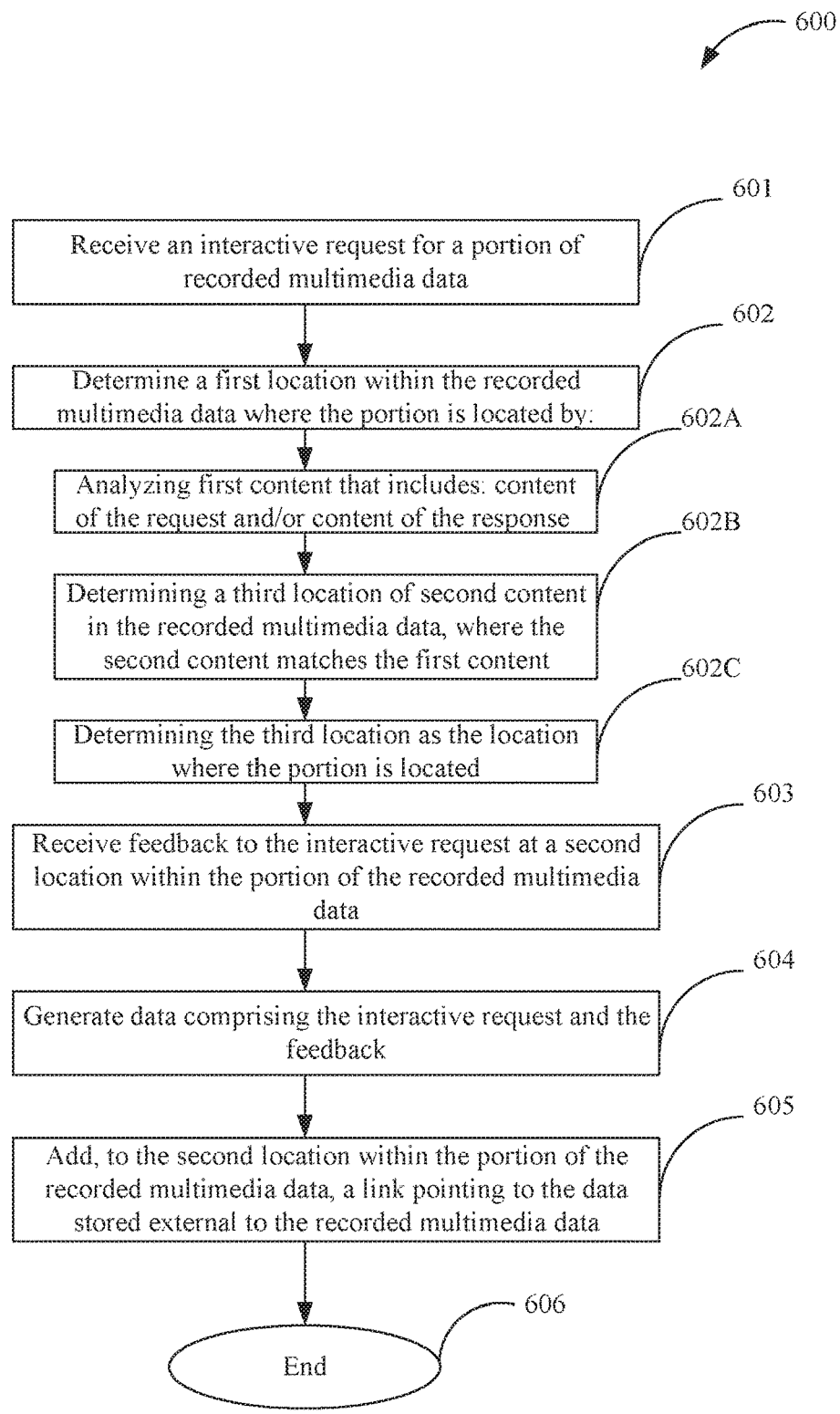
FIG. 6 shows a flow chart of a method to determine a first location within recorded multimedia data and interactively updating the multimedia data, in accordance with embodiments of the present invention.

FIG. 6 shows a flow chart of a method to determine a first location within recorded multimedia data and interactively updating the multimedia data, in accordance with embodiments of the present invention.

A method 600 for updating recorded multimedia data, as shown in FIG. 6, is similar to the method shown in both FIG. 2 and FIG. 5. According to FIG. 6, the method 600 starts at a step 601, where a processor of a computer system may receive an interactive request from a requesting party pertaining to a portion of recorded multimedia data. The step 601 is followed by a step 602, where the processor may determine a first location, within the recorded multimedia data, where the portion of the recorded multimedia data is located.

The step 602 may include a step 602A, a step 602B, and/or a step 602C, among other process steps. According to the step 602A, the processor of the computer system may analyze first content that includes: content of the request and/or content of the response, among other content. Then, the step 602A may be followed by the step 602B, where the processor of the computer system may determine a third location of second content in the recorded multimedia data. The second content may match the first content. The step 602B may be followed by the step 602C, where the processor of the computer system may determine the third location as the location where the portion is located.

The step 602C may be followed by a step 603, where the processor may receive feedback as a response (e.g., from a feedback party) to the received request at a second location within the portion of the recorded multimedia data. According to some examples, the second location may be designated jointly by the requesting party and the feedback party. The step 603 is followed by a step 604, where the processor may generate data comprising both the request and the response. The step 604 may be followed by a step 605, where the processor may add, to the second location within the portion of the recorded multimedia data, a link pointing to the data stored external to the recorded multimedia data. The step 605 may be followed by a step 606, ending the process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for updating a recorded multimedia data, said method comprising:

receiving, by a processor of a computer system, a request from a requesting party pertaining to a portion of recorded multimedia data;

said processor forwarding the received request to a feedback party;

said processor determining a first location, within the recorded multimedia data, where the portion is located by determining a time, at which the portion begins to be played back, relative to a time at which a beginning of the recorded multimedia data begins to be played back;

said processor receiving a designation of a same second location jointly designated by the requesting party and the feedback party, said second location being within the portion of the recorded multimedia data; and in response to said processor receiving a feedback response from the feedback party to the received request at the second location within the portion of the recorded multimedia data, said processor generating first data comprising both the received request and the feedback response and said processor adding, to the second location within the portion of the recorded multimedia data, a link pointing to the first data stored at an address external to the recorded multimedia data; and after said adding and during a subsequent playback of the recorded multimedia data to a user, sail processor automatically performing a first process comprising: identifying the link, pausing the playback at the second location in response to said identifying the link, obtaining the first data stored at the address pointed to by the link and external to the recorded multimedia data, playing back the received request and the feedback response in the obtained first data, and playing back a remainder of the recorded multimedia data, wherein the automatically performed first process does not make the user aware that the played back received request and feedback response are later inserted into the recorded multimedia data.

2. The method of claim 1, wherein said adding comprises adding the first data to the second location of the portion within the recorded multimedia data.

3. The method of claim 1, wherein said determining the first location where the portion is located comprises:
analyzing first content selected from the group consisting of content of the received request, content of the feedback response, and a combination thereof;
determining a third location of the first content in the recorded multimedia data; and
determining that the third location of the first content is the location where the portion is located.

4. The method of claim 1, said method further comprising:
said processor receiving a designation of an access right for access to the first data, said access right jointly designated by the requesting party and the feedback party.

5. A computer program product, comprising a computer readable hardware storage device having computer readable program code stored therein, said program code containing instructions which, upon being executed by a processor of a computer system, implement a method for updating recorded multimedia data, said method comprising:
said processor receiving a request from a requesting party pertaining to a portion of recorded multimedia data;
said processor forwarding the received request to a feedback party;
said processor determining a first location, within the recorded multimedia data, where the portion is located by determining a time, at which the portion begins to be played back, relative to a time at which a beginning of the recorded multimedia data begins to be played back;
said processor receiving a designation of a same second location jointly designated by the requesting party and the feedback party, said second location being within the portion of the recorded multimedia data; and
in response to said processor receiving a feedback response from the feedback party to the received request at the second location within the portion of the recorded multimedia data, said processor generating first data comprising both the received request and the feedback response and said processor adding, to the second location within the portion of the recorded multimedia data, a link pointing to the first data stored at an address external to the recorded multimedia data; and
after said adding and during a subsequent playback of the recorded multimedia data to a user, said processor automatically performing a first process comprising: identifying the link, pausing the playback at the second location in response to said identifying the link, obtaining the first data stored at the address pointed to by the link and external to the recorded multimedia data, playing back the received request and the feedback response in the obtained first data, and playing back a remainder of the recorded multimedia data, wherein the automatically performed first process does not make the user aware that the played back received request and feedback response are later inserted into the recorded multimedia data.

6. The computer program product of claim 5, wherein said adding comprises adding the first data to the second location of the portion within the recorded multimedia data.

7. The computer program product of claim 5, wherein said determining the first location where the portion is located comprises:
analyzing first content selected from the group consisting of content of the received request, content of the feedback response, and a combination thereof;
determining a third location of the first content in the recorded multimedia data; and
determining that the third location of the first content is the location where the portion is located.

8. The computer program product of claim 5, said method further comprising:
said processor receiving a designation of an access right for access to the first data, said access right jointly designated by the requesting party and the feedback party.

9. A computer system comprising a processor, a memory coupled to the processor, and a computer readable storage device coupled to the processor, said storage device containing program code which, upon being executed by the processor via the memory, implements a method for updating recorded multimedia data, said method comprising:
said processor receiving a request from a requesting party pertaining to a portion of recorded multimedia data;
said processor forwarding the received request to a feedback party;
said processor determining a first location, within the recorded multimedia data, where the portion is located by determining a time, at which the portion begins to be played back, relative to a time at which a beginning of the recorded multimedia data begins to be played back;
said processor receiving a designation of a same second location jointly designated by the requesting party and the feedback party, said second location being within the portion of the recorded multimedia data; and
in response to said processor receiving a feedback response from the feedback party to the received request at the second location within the portion of the recorded multimedia data, said processor generating first data comprising both the received request and the feedback response and said processor adding, to the second location within the portion of the recorded multimedia data, a link pointing to the first data stored at an address external to the recorded multimedia data; and
after said adding and during a subsequent playback of the recorded multimedia data to a user, sail processor automatically performing a first process comprising: identifying the link, pausing the playback at the second location in response to said identifying the link, obtaining the first data stored at the address pointed to by the link and external to the recorded multimedia data, playing back the received request and the feedback response in the obtained first data, and playing back a remainder of the recorded multimedia data, wherein the automatically performed first process does not make the user aware that the played back received request and feedback response are later inserted into the recorded multimedia data.

10. The computer system of claim 9, wherein said adding comprises adding the first data to the second location of the portion within the recorded multimedia data.

11. The computer system of claim 9, said method further comprising:
said processor receiving a designation of an access right for access to the first data, said access right jointly designated by the requesting party and the feedback party.

* * * * *